US011410166B2

(12) United States Patent
Falah et al.

(10) Patent No.: US 11,410,166 B2
(45) Date of Patent: Aug. 9, 2022

(54) SYSTEMS AND METHODS FOR AUTOMATED DECENTRALIZED MULTILATERAL TRANSACTION PROCESSING

(71) Applicant: JPMorgan Chase Bank, N.A., New York, NY (US)

(72) Inventors: Samer Falah, Staten Island, NY (US); Tyrone Lobban, London (GB); Naveen Mallela, Singapore (SG); Zekun Shi, Singapore (SG); Sai Murali Krishna Valiveti, Singapore (SG); Archana Manjunatha, Singapore (SG); Zhou Zhiyao, Singapore (SG); Peter Munnings, Riverclub (ZA); Coenie Beyers, Cape Town (ZA); Patrick Mylund Nielsen, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 444 days.

(21) Appl. No.: 16/034,644

(22) Filed: Jul. 13, 2018

(65) Prior Publication Data

US 2019/0019186 A1 Jan. 17, 2019

Related U.S. Application Data

(60) Provisional application No. 62/532,051, filed on Jul. 13, 2017.

(51) Int. Cl.
*G06Q 20/38* (2012.01)
*G06Q 20/22* (2012.01)
*G06Q 20/40* (2012.01)

(52) U.S. Cl.
CPC ..... *G06Q 20/38215* (2013.01); *G06Q 20/223* (2013.01); *G06Q 20/389* (2013.01);
(Continued)

(58) Field of Classification Search
CPC .......... G06Q 20/38215; G06Q 20/405; G06Q 20/4037; G06Q 20/389; G06Q 20/3823; G06Q 20/223
See application file for complete search history.

(56) References Cited

U.S. PATENT DOCUMENTS 9,824,031 B1 * 11/2017 Ganti ..................... G06F 21/00
2017/0024818 A1  1/2017 Wager et al.
(Continued)

FOREIGN PATENT DOCUMENTS

WO   WO-9719427 A2 *  5/1997  ............. G06Q 20/02
WO   WO 2017/098519     6/2017

OTHER PUBLICATIONS

"Gridlock Resolution in Interbank Payment Systems", Morten L. Bech , Jun. 13, 2021, Bank of Finland Discussion Papers (Year: 2001).*

(Continued)

*Primary Examiner* — Neha Patel
*Assistant Examiner* — Duan Zhang
(74) *Attorney, Agent, or Firm* — Greenberg Traurig LLP

(57) ABSTRACT

Systems and methods for automated decentralized multilateral transaction processing are disclosed. According to one embodiment, in an information processing apparatus comprising at least one computer processor, a method for automated decentralized multilateral transaction processing may include: (1) receiving a plurality of transaction requests to conduct a plurality of transactions; (2) determining that a party to a first transaction of the plurality of transactions does not meet a liquidity requirement to conduct the first transaction; (3) executing a netting algorithm to identify a second transaction of the plurality of transactions that when executed allows the first transaction to execute; and (4) executing the first and second transactions.

17 Claims, 2 Drawing Sheets

(52) U.S. Cl.
CPC ....... *G06Q 20/3823* (2013.01); *G06Q 20/405* (2013.01); *G06Q 20/4037* (2013.01)

(56) References Cited

U.S. PATENT DOCUMENTS

| | | | |
|---|---|---|---|
| 2017/0091721 A1* | 3/2017 | Ronca | G06Q 20/065 |
| 2017/0155515 A1 | 6/2017 | Androulaki et al. | |
| 2018/0114205 A1* | 4/2018 | Thomas | G06Q 40/02 |

OTHER PUBLICATIONS

David Fernando Muñoz, et al., "INDEVAL Develops a New Operating and Settlement System Using Operations Research", Interfaces, vol. 41, No. 1, Jan.-Feb. 2011, pp. 8-17 (Year: 2011).*

"New developments in large-value payment system", Committee on Payment and Settlement Systems, May 2005 (Year: 2005).*

"The Ownership of Clearinghouses: When "Skin in the Game" Is Not Enough, the Rem Clearinghouses", Paolo Saguato, Yale Journal on Regulation, vol. 34 Issue 2, pp. 601-666, Jun. 30, 2017. (Year: 2017).*

"Gridlock Resolution in Payment Systems", Morten Linnemann Bech, Dec. 21, 2001, https://www.nationalbanken.dk/en/publications/Pages/2001/12/Gridlock-Resolution-in-Payment-Systems.aspx (Year: 2001).*

"Simulation analyses and stress testing of payment network", Harry Leinonen, 2009 , Federal Reserve Bank of St Louis (Year: 2009).*

"Contemporary Issues in Central Banking", Morten Linnemann Bech, Jun. 2002, university of California (Year: 2002).*

"Economizing on Liquidity with Deferred Settlement Mechanisms", Kurt Johnson, Dec. 2004, Economic Policy Review, Rederal Reserve Bank of New York (Year: 2004).*

International Searching Authority, International Search Report and Written Opinion, International Application No. PCT/US18/41964, pp. 1-8, dated Sep. 14, 2018.

* cited by examiner

SYSTEMS AND METHODS FOR AUTOMATED DECENTRALIZED MULTILATERAL TRANSACTION PROCESSING

RELATED APPLICATIONS

This application claims priority to U.S. Provisional Patent Application Ser. No. 62/532,051, filed Jul. 13, 2017, the disclosure of which is hereby incorporated, by reference, in its entirety.

BACKGROUND OF THE INVENTION

1. Field of the Invention

The present disclosure generally relates to systems and methods for automated decentralized multilateral transaction processing.

DESCRIPTION OF THE RELATED ART

Transaction gridlock may exist where a number of dependent transactions may exist among a number of parties, but some or all of the transactions cannot take place independently. For example, when one party has insufficient liquidity, that party may need to wait to the settlement of another transaction before it can settle others. This leads to a decreased velocity in transaction settlement.

SUMMARY OF THE INVENTION

Systems and methods for automated decentralized multilateral transaction processing are disclosed. According to one embodiment, in an information processing apparatus comprising at least one computer processor, a method for automated decentralized multilateral transaction processing may include: (1) receiving a plurality of transaction requests to conduct a plurality of transactions; (2) determining that a party to a first transaction of the plurality of transactions does not meet a liquidity requirement to conduct the first transaction; (3) executing a netting algorithm to identify a second transaction of the plurality of transactions that when executed allows the first transaction to execute; and (4) executing the first and second transactions.

In one embodiment, the method may further include propagating the transaction requests to a plurality of nodes in a network.

In one embodiment, the transaction requests may be propagated to parties to the transactions.

In one embodiment, the method may further include writing the transactions to a distributed ledger.

In one embodiment, the first transaction may include a private transaction.

In one embodiment, the method may further include queuing the first transaction in a transaction queue. The netting algorithm may execute after a threshold of transactions are in the transaction queue, or after a threshold transaction amount is in the transaction queue.

In one embodiment, at least one of the first and second transactions may be executed as a shielded transaction.

In one embodiment, the netting algorithm may include a smart contract.

According to another embodiment, a system for automated decentralized multilateral transaction processing may include a network comprising a plurality of nodes, each node comprising a distributed ledger and a payment manager, and a plurality of decentralized access points, each decentralized access point associated with a node and comprising a rules orchestrator and a listener. The plurality of nodes may receive a plurality of transaction requests to conduct a plurality of transactions, each transaction request received from an associated decentralized access point. A first payment manager executed at a first of the plurality of nodes for a party to a first transaction may determine that the party to the first transaction does not meet a liquidity requirement to conduct the first transaction, and may submit the first transaction to a first distributed ledger. A first listener in a first decentralized access point associated with the first node may register the first transaction with a netting smart contract. A first rules orchestrator associated with the first decentralized access point may execute the netting smart contract to identify a second transaction of the plurality of transactions that when executed allows the first transaction to execute. The first and second transactions may then be executed.

In one embodiment, the first rules orchestrator may generate a proof for the first transaction.

In one embodiment, the proof generator at a second node associated with the party to the second transaction generates a proof for the second transaction.

In one embodiment, the payment manager may include a smart contact.

In one embodiment, the transaction requests may be propagated to the plurality of nodes in the network.

In one embodiment, the transaction requests may be propagated to parties to the transactions.

In one embodiment, the first transaction may include a private transaction.

In one embodiment, the netting algorithm may after a threshold of transactions are in a transaction queue and/or after a threshold transaction amount is in a transaction queue.

In one embodiment, at least one of the first and second transactions may be executed as a shielded transaction.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein relate to systems and methods for automated decentralized multilateral transaction processing.

Embodiments disclosed herein may enable liquidity optimization measures like Queuing, Netting, Gridlock, and deadlock resolution algorithms, and may operate on "private" transactions without centrality of processing.

Figure 1:
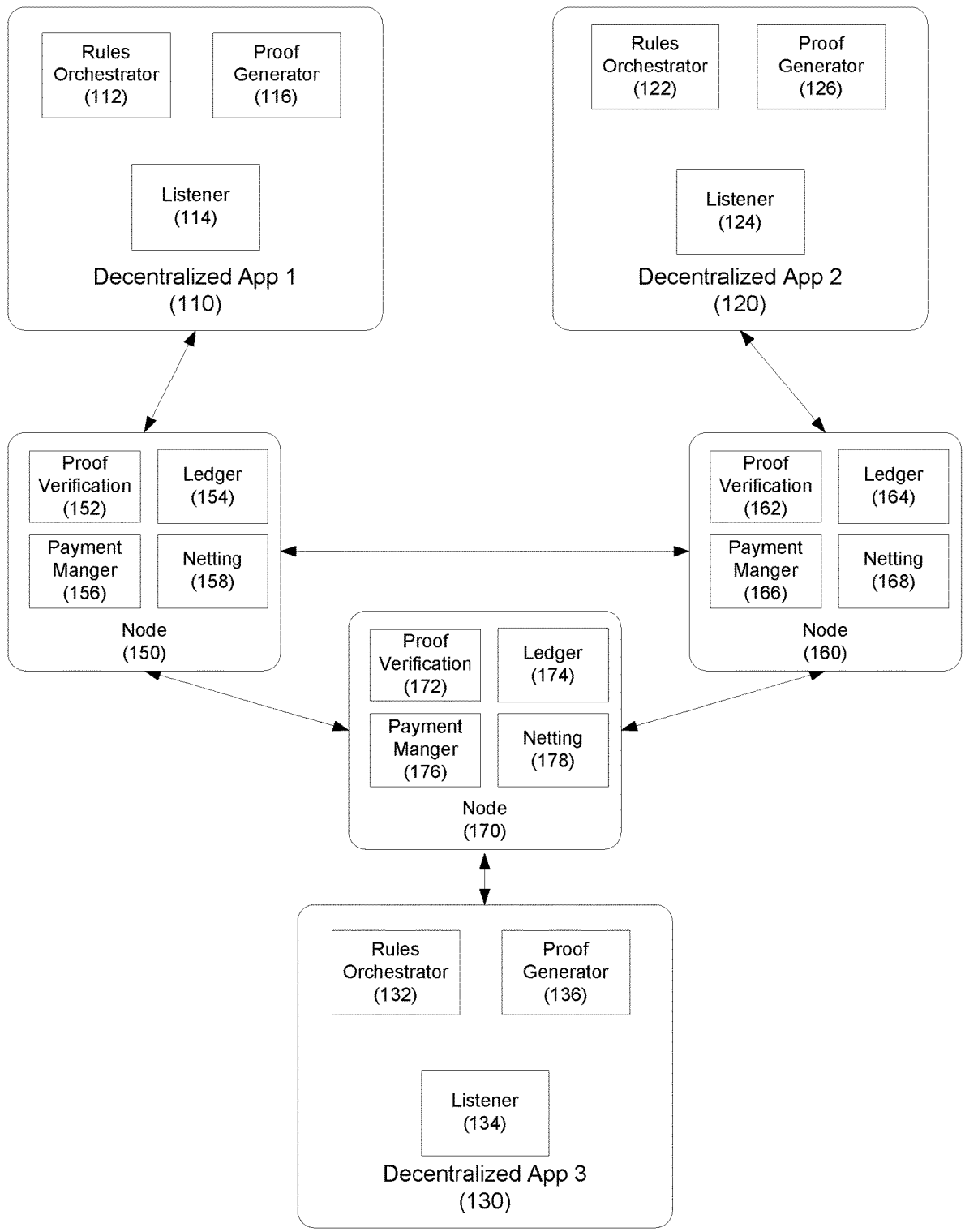
FIG. 1 depicts a systems for automated decentralized multilateral transaction processing according to one embodiment.

Referring to FIG. 1, an exemplary system for automated decentralized multilateral transaction processing is disclosed according to one embodiment. System 100 may include a plurality of decentralized applications or software programs, or access points ("decentralized apps") 110, 120, 130, etc.

Although three decentralized apps are depicted, it should be recognized that a greater, or fewer, number of decentralized apps may be included as is necessary and/or desired.

In one embodiment, each decentralized app 110, 120, 130 may be associated with buyers, sellers, investors, financial institutions, etc.

In one embodiment, each decentralized app 110, 120, 130 may include rules orchestrator 112, 122, 132, listener 114, 124, 134, and proof generator 116, 126, 136.

In one embodiment, rules orchestrator 112, 122, 132 may orchestrates a sequence of steps necessary to fulfil a transaction. Listener 114, 124, 134 may listen to events from its associated distributed ledgers 154, 164, and 174 and may invoke the associated rules orchestrator 112, 122, 132 to perform subsequent steps based on the event. Proof generator 116, 126, 136 may generate the proof for the balance updates required to complete a transaction.

Each node 150, 160, and 170 may include proof verification 152, 162, and 172, respectively. Each proof verification 152, 162, and 172 may verify the proof that is generated by the respective proof generator 116, 126, 136.

Each node 150, 160, and 170 may also include distributed ledgers 154, 164, and 174, respectively. Distributed ledgers 154, 164, and 174 may store the encrypted transactions and shielded balances thereon.

Each node 150, 160, and 170 may also include payment manager 156, 166, 176. In one embodiment, each payment manager 156, 166, 176 may comprise a smart contract.

Each node 150, 160, and 170 may also include netting module 158, 168, 178. In one embodiment, each netting module 158, 168, 178 may comprise a smart contract.

Figure 2:
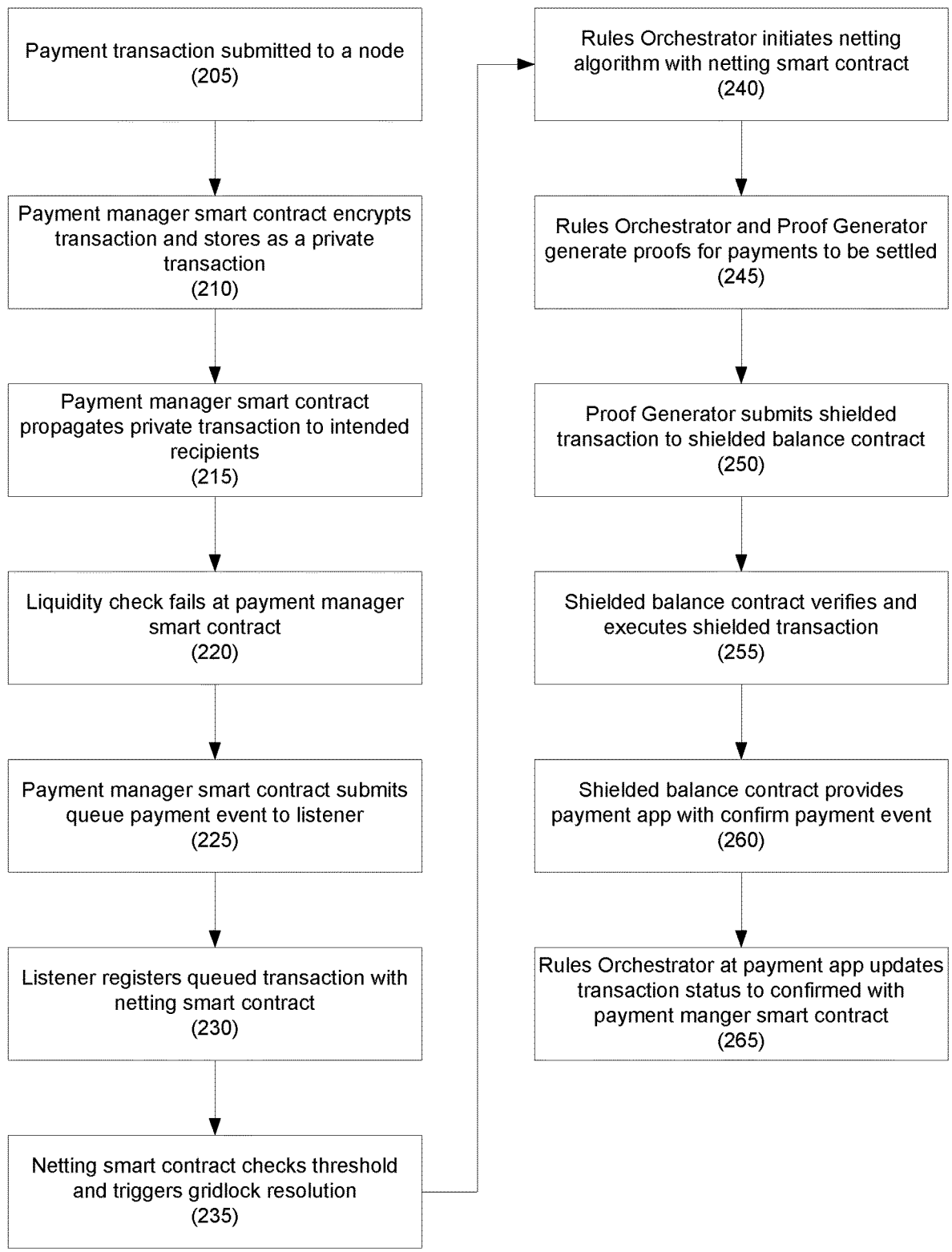
FIG. 2 depicts a method for automated decentralized multilateral transaction processing according to one embodiment.

Referring to FIG. 2, a method for automated decentralized multilateral transaction processing is disclosed according to one embodiment.

In step 205, using a transaction application, computer program, etc. a party may submit a transaction to a node. In one embodiment, the party may be associated with a node in a distributed ledger transaction network.

In one embodiment, the transaction may be a payment transaction, a securities settlement, a combination thereof, or any other suitable transaction.

In step 210, a node may store an encrypted private transaction and in step 215, may communicate the transaction to a distributed ledger network. In one embodiment, the transaction may be propagated to the nodes and/or parties to the transaction. In another embodiment, the transaction may be propagated to all nodes and/or parties in the network.

In one embodiment, a payment manager smart contract executed at the node may perform these functions.

In one embodiment, the transaction, or a portion thereof (if private) may be written to the distributed ledgers for each node.

In step 220, the submitting node may check for liquidity to conduct the transaction. In one embodiment, the payment manager smart contract may perform the liquidity check. If the liquidity check fails (e.g., the submitting node does not have sufficient funds to conduct the transaction), in step 225, the submitting node (e.g., the submitting node's payment manager smart contract) may queue the transaction with a listener in the transaction application. In one embodiment, the queued transaction may be written to the distributed ledger.

In one embodiment, all listeners in the network may be informed of events on the distributed ledger in order to initiate gridlock resolution.

In one embodiment, the payment manager smart contract may be implemented as one or more smart contracts.

In step 230, the transaction application may register the queued transaction with a netting smart contract, which may receive queued transactions from some or all of the nodes in the network. In one embodiment, once a threshold of registered queued transactions is met, the netting contract may trigger the gridlock resolution in step 235.

In one embodiment, the threshold may be based on a number of registered transactions, a number of nodes submitting registered transactions, a currency amount of registered transactions, etc. In one embodiment, the threshold may be selected, for example, to optimize the number of registered transactions that can be executed.

In step 240, the transaction application for each node may execute a netting algorithm. In one embodiment, each node may review its queued transactions, and may determine which queued transactions it can conduct if it were to receive funds it is pledged to receive. It may then submit those transactions to the netting smart contract.

In one embodiment, the nodes may execute the netting algorithm sequentially. In another embodiment, the nodes may execute the netting algorithm simultaneously, or substantially simultaneously.

In step 245, once the netting is complete, the transaction application for each node may generate proofs of payments to be settled, and in step 250 may then submit the shielded transactions to a zero knowledge proof layer which may then, in step 255, verify and execute the transaction(s).

In one embodiment, two proofs may be required (e.g., one from the initiator and one from the receiver) so that each party can update their respective account balances.

In one embodiment, each node may only have knowledge of details of specific transactions to which it is a participant. The nodes may have other information, such as an identifier, for transactions that are written to the distributed ledger.

In step 260, the zero knowledge proof layer may confirm that the transaction(s) were executed, and in step 265, the transaction application may update the status of the transaction with its node to "confirmed."

An illustrative example is as follows. Each of Bank A, B, and C has balances of 0, but Bank A has a pledged balance of 10, bank B has a pledged balance of 5, and Bank C has a pledged balance of 15. Bank A is submitting a transaction to Bank B for 2, but fails the liquidity test.

Thus, using the gridlock resolution method, the transaction is conducted. Bank A's pledged balance is reduced by 2, and Bank B's pledged balance is increased by 2.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated decentralized multilateral transaction processing comprising:
    in an information processing apparatus comprising at least one computer processor and configured as a first node of a distributed ledger network:
        receiving a plurality of transaction requests to conduct a plurality of transactions including a first transaction for execution;
        determining, by a payment manager smart contract of the first node, that a party to the first transaction does not meet a liquidity requirement to conduct the first transaction;
        queueing, by the payment manager smart contract and based on the determining that a party to the first transaction does not meet a liquidity requirement, the first transaction in a listener queue of the first node;
        registering the queued first transaction with a netting smart contract of a netting module of the first node;
        receiving, by the netting smart contract, a plurality of other transactions that are queued at respective listener queues of a plurality of other nodes of the distributed ledger network;
        determining, by the netting smart contract, a number of the plurality of other transactions that are queued at respective listener queues of the plurality of other nodes of the distributed ledger network that can be executed in response to the first transaction being executed;
        triggering, by the netting smart contract, an execution of a netting algorithm when a threshold number of transactions is in the listener queue of the first node to identify a second transaction of the plurality of other transactions that are queued at respective listener queues of the plurality of other nodes of the distributed ledger network, that when executed allows the first transaction to execute; and
    executing the first and second transactions.

2. The method of claim 1, further comprising:
    propagating the plurality of transaction requests to a plurality of nodes in the distributed ledger network.

3. The method of claim 2, wherein the plurality of transaction requests are propagated to parties to the transactions.

4. The method of claim 1, wherein the threshold number of transactions is based on a number of transactions registered with the netting smart contract.

5. The method of claim 1, wherein the first transaction comprises a private transaction.

6. The method of claim 1, further comprising:
    wherein the threshold number of transactions is based on a number of nodes of the distributed ledger network registering transactions with the netting smart contract.

7. The method of claim 1, wherein at least one of the first and second transactions is executed as a shielded transaction.

8. The method of claim 1, wherein the netting algorithm comprises a smart contract.

9. A system for automated decentralized multilateral transaction processing comprising:

a distributed ledger network comprising a plurality of nodes, each node comprising a distributed ledger and a payment manager smart contract;

a plurality of decentralized access points, each decentralized access point associated with a node and comprising a rules orchestrator and a listener;

wherein:

a first node of the plurality of nodes receives a plurality of transaction requests to conduct a plurality of transactions, the plurality of transaction requests including a first transaction for execution, wherein each transaction request is received from an associated decentralized access point;

a first payment manager smart contract executed at the first node of the plurality of nodes determines that a party to the first transaction does not meet a liquidity requirement to conduct the first transaction;

based on the determination that the party to the first transaction does not meet a liquidity requirement to conduct the first transaction, the first payment manager smart contract queues the first transaction in a first listener queue of a first decentralized access point associated with the first node;

the first listener queue in the first decentralized access point associated with the first node registering the first transaction with a netting smart contract of a netting module of the first node;

the netting smart contract receives a plurality of other transactions that are queued at respective listener queues of decentralized access point associated with other nodes of the distributed ledger network;

the netting smart contract determines when a threshold number of transactions is in the first listener queue, wherein the execution comprises determining a number of transactions in the first listener queue which can execute if the first transaction is executed;

a first rules orchestrator associated with the first decentralized access point executing the netting smart contract to identify a second transaction of the plurality of transactions that when executed allows the first transaction to execute; and executing the first and second transactions.

10. The system of claim 9, wherein the first rules orchestrator generates a proof for the first transaction.

11. The system of claim 10, wherein a proof generator at a second node associated with the party to the second transaction generates a proof for the second transaction.

12. The system of claim 9, wherein the threshold number of transactions is based on a number of transactions registered with the netting smart contract.

13. The system of claim 9, wherein the plurality of transaction requests are propagated to the plurality of nodes in the distributed ledger network.

14. The system of claim 9, wherein the plurality of transaction requests are propagated to parties to the transactions.

15. The system of claim 9, wherein the first transaction comprises a private transaction.

16. The system of claim 9, wherein the threshold number of transactions is based on a number of nodes of the distributed ledger network registering transactions with the netting smart contract.

17. The system of claim 9, wherein at least one of the first and second transactions is executed as a shielded transaction.

* * * * *